United States Patent [19]

Marien et al.

[11] 4,112,022

[45] Sep. 5, 1978

[54] NITRILE RESINS STABILIZED AGAINST DISCOLORATION AND METHOD FOR PRODUCING THE SAME

[75] Inventors: Bruce Arthur Marien; Paul Richard Kaufman, both of Parkersburg, W. Va.

[73] Assignee: Borg-Warner Corporation, Chicago, Ill.

[21] Appl. No.: 783,112

[22] Filed: Mar. 31, 1977

[51] Int. Cl.$^2$ ............................ C08K 5/20; C08K 5/10
[52] U.S. Cl. .............................. 260/881; 260/45.85 E; 260/45.9 NC; 260/880 R
[58] Field of Search ............... 260/45.85 E, 45.9 NC, 260/29.6 AQ, 29.6 AN, 880 R, 881; 526/216, 217, 341

[56] References Cited

U.S. PATENT DOCUMENTS

| | | | |
|---|---|---|---|
| 3,435,012 | 3/1969 | Nordlander | 526/217 |
| 3,925,305 | 12/1975 | Wardlow | 260/45.9 NC |
| 3,959,224 | 5/1976 | Coleman et al. | 260/29.6 AN |
| 3,970,644 | 7/1976 | Hardy et al. | 260/45.9 NC |

*Primary Examiner*—V. P. Hoke
*Attorney, Agent, or Firm*—Richard J. Schlott

[57] ABSTRACT

Nitrile resins, when coagulated from a latex emulsion with inorganic salts of Groups IIA metal ions and compounded with an acrylic acid derivative such as the acrylate of a polyol, an N-substituted acrylamide or a bisacrylamide, exhibit marked improvement in stability toward thermal discoloration.

7 Claims, No Drawings

NITRILE RESINS STABILIZED AGAINST DISCOLORATION AND METHOD FOR PRODUCING THE SAME

BACKGROUND OF THE INVENTION

The present invention relates to a method for stabilizing nitrile resins against discoloration resulting from thermal degradation during processing. More particularly this invention relates to the stabilization of polymers and graft polymers of acrylonitrile to prevent thermal discoloration by the inclusion of a minor amount of an ethylenically-unsaturated amide or ester. Still more particularly, this invention relates to the stabilization of emulsion-polymerized polymers and graft polymers of acrylonitrile by the inclusion of a minor amount of an ethylenically-unsaturated amide or ester together with minor amounts of a Group IIA metal salt.

Acrylonitrile polymer and copolymer resins are generally regarded as being materials of good thermal stability. They are, however, subject to thermal discoloration, and thermal processing of the unstabilized resins frequently results in development of yellow, amber and even reddish casts during the extrusion of films and fibers. Consequently a substantial effort has been made to develop methods of reducing or eliminating thermal discoloration to produce clear, color-stable films and molded articles. Prior art methods for stabilizing acrylonitrile resins against thermal discoloration include such processes as adding small amounts of such compounds as maleic acid, dialkyltin maleates, maleimide and the like as color stabilizers. More recently, the addition of minor amounts of acrylamide to acrylonitrile resins has been shown to provide improved stability against thermal discoloration, such as is shown in U.S. Pat. No. 3,925,305. Related acrylamides, however, and in particular N-substituted acrylamides, have been reported as ineffective for the purpose of stabilizating nitrile resins. Certain acrylates have also been employed to stabilize polyacrylonitrile against gel formation. The use of polyfunctional acrylates to stabilize nitrile resins has not been reported.

SUMMARY OF THE INVENTION

It has now been found that N-substituted amides and esters of ethylenically-unsaturated acids are highly effective stabilizers for nitrile resins when employed with minor amounts of Group IIA metal salts. More particularly, the esters and the N-substituted amides of acrylic acid are very effective color stabilizers for nitrile resins when used in conjunction with minor amounts of a Group IIA metal salt. The Group IIA metal salt is generally added by coagulation of the nitrile resin latex with an aqueous solution of the salt, while the amide or ester may either be added to the latex prior to coagulation or subsequently blended into the coagulated resin prior to thermal processing. The resulting compositions are markedly improved in stability toward yellowing during thermal processing.

DETAILED DESCRIPTION OF THE INVENTION

The resins which are useful for the purposes of this invention are polymers of an $\alpha,\beta$-unsaturated nitrile, one or more vinyl monomers copolymerizable with the unsaturated nitrile and, optionally, a diene rubber, and include blends of two or more such resins.

The polymers are produced by polymerizing a mixture of an unsaturated nitrile such as acrylonitrile with one or more other vinyl monomers copolymerizable therewith in an aqueous medium, optionally in the presence of a preformed diene rubber. The diene rubber may be a homopolymer of a conjugated diene monomer such as butadiene, 1,3,-isoprene, and the like, or a rubbery copolymer thereof.

The unsaturated nitriles useful in the present invention are the alpha, beta unsaturated nitriles selected from the group consisting of acrylonitrile, alpha-chloroacrylonitrile, alpha-fluoroacrylonitrile, methacrylonitrile, ethacrylonitrile, and the like. The preferred unsaturated nitrile is acrylonitrile.

The vinyl monomers copolymerizable with the unsaturated nitriles which are useful in this invention include vinyl aromatic monomers, acrylate esters and the like. The vinyl aromatic monomers are selected from the group consisting of styrene, alpha-methylstyrene, the vinyl toluenes, the vinyl xylenes, and the like. The preferred vinyl aromatic monomer is styrene. The acrylate esters include those selected from the group consisting of methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. The preferred acrylate esters are methyl acrylate, ethyl acrylate, methyl methacrylate, and ethyl methacrylate.

The polymers useful in this invention are prepared by the polymerization of 100 parts by weight of a mixture of from 10 to 90% by weight, preferably from 50 to 90% by weight, of at least one nitrile and from 90 to 10% by weight, preferably from 50 to 10% by weight, of at least one vinyl monomer selected from the group consisting of styrene, alpha-methylstyrene and acrylate esters, in the presence of from 0 to 40 parts by weight of a rubbery polymer of a conjugated diene selected from the group consisting of butadiene and isoprene optionally including up to 50% by weight of a comonomer selected from the group consisting of styrene, ethyl acrylate, and acrylonitrile. The resin preparation may optionally include minor amounts of a di- or tri-functional comonomer either with the nitrile monomer mixture or the preparation of the diene rubber to accomplish additional gross-linking, as is well known in the polymerization art.

The nitrile resins are obtained by emulsion polymerization using any of a variety of widely-known processes and catalysts, including for example peroxide initiators, redox catalysts and the like. The polymerization processes which result in stable latex emulsions are well-described in the art and do not as such constitute a part of the invention described herein.

The resulting latices are coagulated and dried to provide the solid nitrile resin. Coagulation of resin latices is accomplished in the art by a variety of methods including addition of an alcohol or other water-miscible nonsolvent, and salt-coagulation, which employs soluble electrolytes such as Group I, II or III inorganic salts. As will be further shown hereinbelow, the color stabilizers useful in this invention are effective only with nitrile resins that have been salt-coagulated with a Group IIA inorganic salt, and it is an essential part of the instant invention that the resins be coagulated with an inorganic salt of a Group IIA metal ion. The Group IIA metal salts useful for the purposes of this invention are the water soluble inorganic salts of magnesium, calcium, barium and strontium. Since the salts are employed to coagulate the nitrile resin latex, it is thus necessary that the salts be sufficiently water soluble to be useful in a salt-coagulation process step.

The acrylic acid derivatives useful as color stabilizers are the poly-functional acrylate esters and the N-substituted amides of acrylic acid. The acrylate esters are the acrylates of polyols, including di- tri-, and tetrafunctional alcohols, such as for example ethylene glycol diacrylate, diethylene glycol diacrylate, triethylene glycol diacrylate, tetraethylene glycol diacrylate, butanediol diacrylate, hexanediol diacrylate, trimethylolpropane triacrylate, pentaerythritol triacrylate and the like. The N-substituted acrylamides useful for the purposes of this invention include both the mono-amides, for example N-alkyl acrylamides, N-[alkoxyalkyl] acrylamides and N-[substituted alkyl] acrylamides, such as diacetone acrylamide, N-isobutoxymethylene acrylamide, sodium 2-acrylamido-2-methylpropane sulfonate and the like, and the alkylene bis-acrylamides such as for example methylene-bisacrylamide, ethylene bisacrylamide and the like.

The esters and amides are effective stbilizers even at very low levels, and thus may be employed in amounts as small as 0.01 part by weight per 100 parts by weight of nitrile resin. Although amounts as large as 10 parts by weight and greater may be employed, these large amounts will have a deleterious effect on resin properties, and therefore, as a practical matter the amounts employed will be less than 5 parts, preferably less than 2 parts per hundred parts by weight of nitrile resin.

The acrylate ester and amide stabilizers employed to color stabilize the nitrile resins will generally be added to the dry resin in a subsequent compounding step. Alternatively, where the particular acrylate ester or amide selected has very low solubility in water, the stabilizer may be added to the nitrile resin latex just prior to the salt coagulation step.

The nitrile resins can be further compounded with additives, pigments, colorants, stabilizers, etc., as is well known in the art, and may be blended with other resins either in the latex form prior to coagulation or as dry resins during the compounding thereof.

The compositions of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength, good solvent resistance, and low permeability to gases and vapors make them very useful in the packaging industry, and they are particularly useful in the manufacture of bottles, film, and other types of containers for liquids and solids.

The following examples will further illustrate the present invention in greater detail, however it is to be understood that the scope of this invention is not to be limited by these examples.

EXAMPLE 1: GRAFT POLYMER LATEX PREPARATION

A polymer reactor was charged with 1519.4g of a styrene-butadiene rubber (25% styrene) latex containing 600g of polymer solids, 896.2g of water, and 20g of sodium alkyl benzene sulfonate emulsifier. The reaction mixture was stirred and heated to 70° C and the following solutions were fed into the reactor over a 100 minute period.

1. 240g. of acrylonitrile, 160g of styrene, and 0.625g of cumene hydroperoxide.
2. 0.50g of sodium formaldehyde sulfoxylate, 0.778g of trisodium hydroxyethylenediamine triacetic acid, and 0.024g ferrous sulfate in 100g of water.

The reaction was continued for two hours to give a graft polymer latex having 60% rubber component.

EXAMPLE 2: STYRENE-ACRYLONITRILE COPOLYMER LATEX PREPARATION

A polymer reactor was charged with 2003.8g of water, 0.75g of potassium persulfate, and 37.5g of sodium alkyl benzene sulfonate emulsifier. The reaction mixture was stirred and heated to 70° C and the following solutions were fed continuously to the reactor over a 100 minute period.

1. 562.5 of acrylonitrile, 187.5 of styrene, and 1.125g of t-dodecyl mercaptan.
2. 3.75g of potassium persulfate in 246.2g of water.

The reaction was continued for four hours at 70° C to give a SAN copolymer latex.

EXAMPLE 3: COPOLYMER GRAFT POLYMER BLEND LATEX

A latex blend was prepared by thoroughly mixing 300 parts of the graft polymer latex of Example 1 with 700 parts of the copolymer latex of Example 2. The resulting latex contains approximately 60 wt.% acrylonitrile.

EXAMPLES 4 – 26: COAGULATION OF LATICES

Resin and resin blend latices prepared as in Examples 2 and 3 were coagulated by pouring the latices into 1.5 volumes of water heated to 70° C and containing approximately 0.1 moles/liter of the appropriate inorganic salt to provide compositions for testing. The coagulated latices were collected by filtration, washed with water and dried at 60° C in a circulating air oven.

The effectiveness of various stabilizers was determined by dry-mixing the stabilizer and dry resin, then adding the blend to the mixing head of a Brabender Plastic-order preheated to 184° C. The material was allowed to flux, then sampled at the indicated times. The samples were compression molded into 33 mm. discs and compared with yellowness Index standards calibrated on a General Electric Recording Spectophotometer.

Table I

| | | | Yellowness Index at 10 min. | | |
|---|---|---|---|---|---|
| Ex. No. | Resin[1] Ex. No. | Coagulant Salt | No Stabilizer | ½ part TMPTA[2] | ½ part MBA[2] |
| 4 | 3 | $MgCl_2$ | 24.9 | 17.0 | 16.7 |
| 5 | 3 | $CaCl_2$ | 34.2 | 24.1 | 16.5 |
| 6 | 3 | $SrCl_2$ | 36.4 | 21.9 | — |
| 7 | 3 | $BaCl_2$ | 26.9 | 16.9 | 16.0 |
| 8 | 3 | $Al_2(SO_4)_3$ | 36.1 | 37.1 | 32.5 |
| 9 | 3 | $Al_2(SO_4)_3 \cdot 1CaCl_2$ | 34.5 | 30.8 | — |
| 10 | 3 | $ZnCl_2$ | 98.8 | 80.6 | 53.3 |
| 11 | 3 | $SnCl_2$ | 61.1 | — | 58.2 |
| 12 | 3 | $CuSO_4$ | maroon | — | rust |
| 13 | 3 | None[3] | 68.4 | — | 78.2 |

Notes:
[1] Resin of Example 3, coagulated with the salt indicated. All compositions contain ½ part by weight calcium stearate lubricant.
[2] TMPTA is Tetramethylolpropane triacrylate; MBA is methylene bisacrylamide.
[3] Resin of Example 3, isolated by freeze coagulation of the latex.

It will be apparent from a comparison of the yellowness index data for Examples 4–7 that both the triacrylate TMPTA and the bis-acrylamide MBA are effective color stabilizers when employed with salt-coagulated resins, provided that the salt employed is a Group II metal salt. Use of other salts, Examples 8–12 results in resins which are not color stable when employed with the stabilizers of this invention. Surprisingly, a freeze-thaw coagulated latex, Example 13, could not be color stabilized with the stabilizers of this invention, demonstrating that a synergistic effect results from the combination of stabilizer and Group IIA metal ion.

Table II

Comparison of Alum-Coagulated and $CaCl_2$-Coagulated Resins

| Ex. No. | Resin[1] No. | Coagulant Salt | Stabilizer | Yellowness Index[3] 10' | 15' | 20' | 25' |
|---|---|---|---|---|---|---|---|
| 14 | 3 | $CaCl_2$ | none | 13 | 25 | 36 | 43 |
| 15 | 3 | $CaCl_2$ | TEGDA[2] | 11 | 14 | 17 | 20 |
| 16 | 3 | $Al_2(SO_4)_3$ | none | 28 | 40 | 50 | 60 |
| 17 | 3 | $Al_2(SO_4)_3$ | TEGDA[2] | 33 | 45 | 50 | 60 |

Notes:
[1] Resin of Example 3, coagulated with the salt indicated.
[2] TEGDA is tetraethylene glycol diacrylate, employed at ¼ part by weight per hundred parts resin.
[3] Yellowness index at times indicated. See text.

Again it will be apparent from a comparison of the data presented in Table II that the diacrylate ester is an effective color stabilizer for nitrile resins coagulated with a Group IIA metal salt. The conventional alum coagulant employed in the preparation of Examples 16 and 17 results in resins which are not color stabilized by the additives of this invention.

Table III

Comparison of various stabilizers in $CaCl_2$-Coagulated resins

| Example[1] No. | Stabilizer Type[2] | phr | Yellowness index at 10' | 15' | 20' | 25' |
|---|---|---|---|---|---|---|
| 14 | None | — | 13 | 25 | 26 | 43 |
| 18 | DAA | ¼ | 14 | 19 | 24 | 31 |
| 19 | DDA | ¼ | 14 | 16 | 18 | 20 |
| 20 | MBA | ¼ | 10 | 13 | 17 | 20 |
| 21 | TEGDA | ¼ | 17 | 20 | 25 | 27 |
| 22 | TMPTA | ¼ | 14 | 19 | 22 | 28 |
| 23 | HDODA | ¼ | 13 | 18 | 22 | 27 |

Notes:
[1] Resin of Example 3, coagulated with $CaCl_2$.
[2] DAA = Diacetone acrylamide; MBA = methylene bisacrylamide; TEGDA = tetraethylene glycol diacrylate; TMPTA = trimethylolpropane triacrylate; HDODA = hexanediol diacrylate.

That N-[substituted alkyl] acrylamides (Examples 18 and 19), bis acrylamides (Example 20), and di- and triacrylates (Examples 21–23) are effective color stabilizers for nitrile resins is clearly shown the the Yellowness Index values summarized in Table III.

EXAMPLE 24

A portion of the latex of Example 2, coagulated with $CaCl_2$ and dried, was compounded with ¼ part by weight methylene bisacrylamide and ¼ part by weight calcium stearate per hundred parts by weight styrene-acrylonitrile copolymer resin. The color stability test, run as before, gave the following Yellowness Index values:
10 at 10 min; 15 at 20 min; 20 at 25 min.
A control resin, tested without stabilizer, gave the following Yellowness Index values:
18 at 10 min; 41 at 20 min; 49 at 25 min.

EXAMPLE 25

To a portion of the latex blend of Example 3 was added ¼ part by weight of trimethylol-propane trimethacrylate per hundred parts of polymer latex solids. The latex was then coagulated with $CaCl_2$, dried, and tested for color stability. The following Yellowness Index values are obtained:
20 at 10 min; 29 at 20 min; 35 at 25 min.

EXAMPLE 26

A portion of the latex blend of Example 3, coagulated with $CaCl_2$ and dried, was compounded with ¼ part by weight sodium 2-acrylamido-2-methylpropane sulfonate ad ¼ part by weight calcium stearate per hundred parts by weight resin blend. The color stability test, run as before, gave the following Yellowness Index values:
11 at 10 min; 19 at 20 min; 22 at 25 min.

The invention, as clearly shown by consideration of the various examples, is a color-stabilized nitrile resin composition comprising a nitrile resin which is salt-coagulated with an inorganic salt of a Group IIA metal ion, and particular acrylic acid compounds selected from the group consisting of the acrylate derivatives of polyols, including di-, tri- and tetra- functional polyols, N-substituted acrylamides, and bisacrylamides, and a method for preparing color stabilized nitrile resin compositions.

We claim:
1. A nitrile resin composition stable toward thermal discoloration comprising:
   A. a polymer selected from the group consisting of polymers of an $\alpha, \beta$-unsaturated nitrile with at least one other vinyl monomer copolymerizable therewith; graft polymers of an $\alpha, \beta$-unsaturated nitrile, at least one additional vinyl monomer copolymerizable therewith and a diene rubber; and blends thereof, said polymer having been coagulated from a latex emulsion by use of an inorganic salt of a Group IIA metal ion, and
   B. as a stabilizer, an effective amount of an acrylic acid compound selected from the group consisting of the acrylate esters of $C_2$ to $C_6$ alkylene glycols, N-(substituted alkyl) acrylamides, alkylene bisacrylamides, and mixtures thereof.
2. A nitrile resin composition stable toward thermal decomposition comprising:
   A. 100 parts by weight of a polymer selected from the group consisting of polymers of an $\alpha, \beta$-unsaturated nitrile selected from the group consisting of acrylonitrile, alpha-chloroacrylonitrile, methacrylonitrile and mixtures thereof, and at least one other vinyl monomer copolymerizable therewith selected from the group consisting of styrene, alpha-methylstyrene, vinyl toluene, vinyl xylene, methyl acrylate, methyl methacrylate, ethyl acrylate, butyl acrylate; graft polymers of an $\alpha, \beta$-unsaturated nitrile selected from the group consisting of acrylonitrile, alpha-chloroacrylonitrile, methacrylonitrile and mixtures thereof, at least one other vinyl monomer copolymerizable therewith, said vinyl monomer being selected from the group consisting of styrene, alpha-methylstyrene, vinyl toluene, vinyl xylene, methyl acrylate, methyl methacrylate, ethyl acrylate, and butyl acrylate, and a diene rubber, said diene rubber being selected from the group consisting of polybutadiene, polyisoprene, and rubbery copolymers thereof containing up to 50% by weight of a comonomer selected from the group consisting of styrene, acrylonitrile and ethyl acrylate; and blends thereof, said polymer having been coagulated from a latex emulsion by use of an inorganic salt of a Group IIA metal ion, and

B. As a stabilizer, from 0.01 to 10 parts by weight of an acrylic acid compound selected from the group consisting of ethylene glycol diacrylate, diethylene glycol diacrylate, triethylene glycol diacrylate, tetraethylene glycol diacrylate, butanediol diacrylate, hexanediol diacrylate, trimethylolpropane triacrylate, pentaerythritol triacrylate, diacetone acrylamide, N-isobutoxymethylene acrylamide, sodium 2-acrylamido-2-methylpropane sulfonate, methylene bisacrylamide, ethylene bisacrylamide and mixtures thereof.

3. The composition of claim 3 wherein the acrylic acid compound is trimethylolpropane trimethyacrylate.

4. The composition of claim 2 wherein the acrylic acid compound is methylene bisacrylamide.

5. The composition of claim 2 wherein the acrylic acid compound is diacetone acrylamide.

6. A method for stabilizing nitrile toward thermal discoloration comprising:

A. Providing a latex emulsion of a polymer selected from the group consisting of polymers of an α, β-unsaturated nitrile with at least one other vinyl monomer copolymerizable therewith; graft polymers of an α, β-unsaturated nitrile, at least one other vinyl monomer copolymerizable therewith and a diene rubber; and blends thereof, B. Coagulating the nitrile resin from the latex emulsion by use of an inorganic salt of a Group IIA metal ion and C. Adding to the nitrile resin an effective amount of an acrylic acid compound selected from the group consisting of ethylene glycol diacrylate, diethylene glycol diacrylate, triethylene glycol diacrylate, tetraethylene glycol diacrylate, butanediol diacrylate, hexanediol diacrylate, trimethyolpropane triacrylate, pentaerythritol triacrylate, diacetone acrylamide, N-isobutoxymethylene acrylamide, sodium 2-acrylamide-2-methylpropane sulfonate, methylene bisacrylamide, ethylene bisacrylamide and mixtures thereof.

7. The method of claim 6 wherein the step of adding the acrylic acid compound is accomplished prior to coagulation of the nitrile resin.

* * * * *